Figure 1:
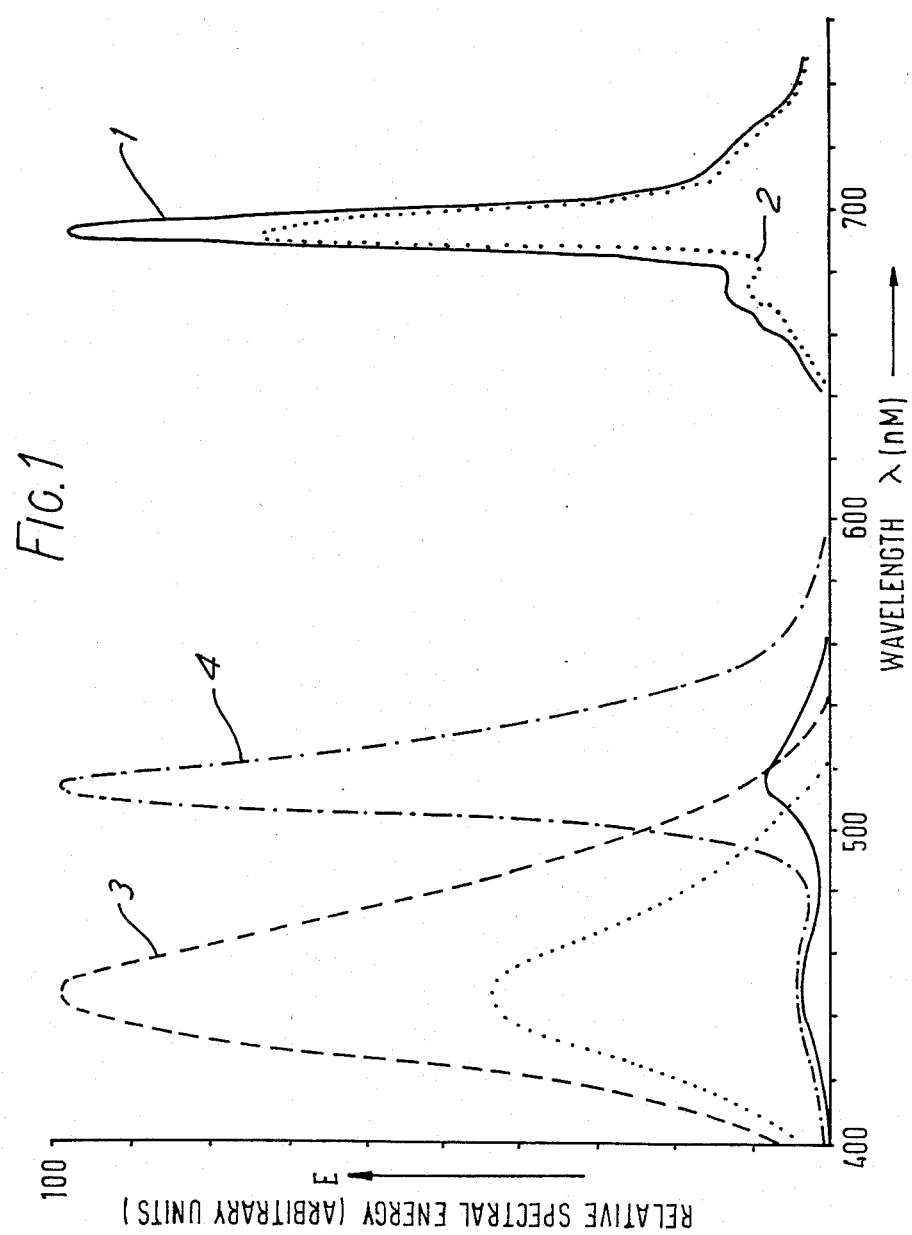

United States Patent [19]

Catherall et al.

[11] Patent Number: 4,806,825
[45] Date of Patent: Feb. 21, 1989

[54] INFRA-RED PHOSPHORS

[75] Inventors: Colin L. R. Catherall, Enfield; Martin J. Fuller, Greenford, both of England

[73] Assignee: Thorn EMI plc, London, England

[21] Appl. No.: 196,031

[22] Filed: May 19, 1988

[30] Foreign Application Priority Data

May 20, 1987 [GB] United Kingdom ............... 8711920

[51] Int. Cl.⁴ .............................................. C09K 11/64
[52] U.S. Cl. ............................. 313/486; 252/301.4 R; 252/301.6 R; 313/638; 428/690
[58] Field of Search ............... 252/301.4 R, 301.6 R; 313/486, 638; 428/690

[56] References Cited

U.S. PATENT DOCUMENTS

| | | | |
|---|---|---|---|
| 3,294,699 | 12/1966 | Lange | 252/301.4 R |
| 3,595,803 | 7/1971 | Dugger | 252/301.4 R |
| 4,071,465 | 1/1978 | Vodoklys | 252/301.4 R |
| 4,161,457 | 7/1979 | Takahashi et al. | 252/301.4 R |
| 4,441,049 | 4/1984 | Verstegen et al. | 252/301.4 R |
| 4,524,300 | 6/1985 | Rutten et al. | 252/301.4 R |
| 4,719,387 | 1/1988 | Catherall | 252/301.4 R |

FOREIGN PATENT DOCUMENTS

| | | |
|---|---|---|
| 0125731 | 11/1984 | European Pat. Off. . |
| 0158778 | 10/1985 | European Pat. Off. . |
| 0158782 | 10/1985 | European Pat. Off. . |
| 53-54183 | 5/1978 | Japan ............ 252/301.4 R |
| 59-93783 | 5/1984 | Japan ............ 252/301.4 R |
| 2039517 | 8/1980 | United Kingdom . |

OTHER PUBLICATIONS

Blasse et al., "Physics Letters", vol. 25A, No. 1, 7/67, pp. 29–30.
Barthem et al., "J. of Lumin." 27, 8/82, pp. 231–235.

Primary Examiner—Jack Cooper
Attorney, Agent, or Firm—Fleit, Jacobson, Cohn & Price

[57] ABSTRACT

A phosphor comprises a chromium activated alkaline earth aluminate having a hexagonal crystal structure and incorporates divalent europium as a sensitizer. The phosphor may also incorporate one or more of divalent manganese and/or zinc and/or magnesium. Such a phosphor emits in the infra-red.

14 Claims, 2 Drawing Sheets

INFRA-RED PHOSPHORS

This invention relates to phosphors which emit mainly in the region of the electromagnetic spectrum between 650 and 800 nm. This region covers the boundary between the far red end of the visible spectrum and the invisible infra-red radiations. For the sake of convenience, emissions in this spectral range will be referred to as infra-red.

Materials which emit in the infra-red are of growing importance and fluorescent lamps which emit predominantly in the infra-red are used in a number of technical processes.

A well known phosphor which emits in the infra-red is lithium aluminate activated by iron ($LiAlO_2:Fe$), but this has serious disadvantages when attempts are made to use it in suspension to internally coat the glass tubing used to make fluorescent lamps. Suspensions of the phosphor rapidly deteriorate and, during the manufacture of the fluorescent tube, the phosphor tends to cause embrittlement of the glass. Also lamps, when eventually made with this phosphor, have a poor maintenance of light output with operating time.

Trivalent chromium ions can emit infra-red luminescence when incorporated as an activator in certain phosphor lattices and when excited by an appropriate means such as electromagnetic radiation in a suitable wavelength range and G.B. No. 2 039 517B discloses an infra-red emitting phosphor which includes gadolinium. In general, the trivalent chromium ion, when it is incorporated in a lattice as the sole activator, is not efficiently excited by ultra-violet radiation at 254 nm. Lattices containing chromium ions tend therefore to be unsuitable for use in low pressure mercury discharge lamps to convert the radiation of approximately 254 nm in the discharge to infra-red radiation.

It is an object of the present invention to provide an infra-red emitting phosphor which alleviates at least some of the problems described hereinbefore.

According to the invention there is provided a phosphor comprising a chromium activated alkaline earth aluminate having a hexagonal crystal structure and incorporating divalent europium, and optionally one or more of divalent manganese and/or zinc and/or magnesium.

In a preferred embodiment, the phosphor incorporates divalent manganese.

The divalent europium and divalent manganese act as sensitisers to absorb ultraviolet radiation and convert it to energies which are more effectively absorbed by the chromium ions and converted to infra-red radiation.

A phosphor in accordance with the invention may have a composition represented by the general formula:

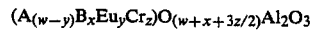

where
A represents the alkaline earths barium or strontium or a combination of the two,
B represents the alkaline earth magnesium which may be partly or wholly replaced by zinc, and either, or a combination of the two, may be partly or wholly replaced by manganese,
w is from 0.01 to 0.6,
x is from 0.01 to 0.98,
y is from 0.005 w to 0.70 w, and
z is from 0.0001 to 0.06.

In the above formula, w may be desirably in the range of from 0.015 to 0.35 inclusive and preferably from 0.075 to 0.30. x may be desirably in the range of from 0.012 to 0.65 inclusive, and preferably from 0.055 to 0.45. y may be desirably in the range of from 0.005 w to 0.50 w inclusive, and preferably from 0.0075 w to 0.25 w. z may be desirably in the range of from 0.0003 to 0.025 inclusive and preferably from 0.0005 to 0.0125.

In a beneficial embodiment of the invention, the phosphor may be represented by:

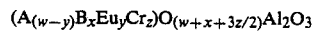

where
w is in the range from 0.015 to 0.35,
x is in the range of from 0.012 to 0.65,
y is in the range of from 0.005 w to 0.50 w,
and z is in the range of from 0.0003 to 0.025.
and A is barium or strontium or a combination of the two and B is magnesium or zinc or a combination of the two which may be partly or wholly replaced by manganese.

The phosphors according to the invention may be prepared by heating mixtures of oxides, or compounds which yield the oxides, of barium, strontium, magnesium, zinc, manganese, europium, chromium and aluminium.

The invention also provides a luminescent screen using a phosphor according to the invention and a fluorescent lamp comprising an envelope, the internal surface of which is coated with a phosphor according to the invention. Such fluorescent lamps include low pressure mercury vapour and low pressure cadmium vapour discharge lamps.

The component materials of the phosphor should be of a purity usually associated with the preparation of inorganic phosphors.

The compounds are intimately mixed together and then heated to a temperature of at least 1100° C. and preferably between 1200° C. and 1500° C. in a reducing atmosphere of, for example, a 90:10 ratio of nitrogen to hydrogen by volume. It is beneficial to replace part of one of the components by the corresponding fluoride to act as a flux. For example part of the magnesium oxide, if present, may be replaced by $MgF_2$ or part of the aluminium oxide by aluminium fluoride. Alternatively the components may be fired in the presence of boric acid. The use of a flux promotes grain growth and also enables the firing temperature to be lowered which is of particular importance when zinc compounds are incorporated in the reactant blend. When cool the product is crushed and sieved.

Other modifications to this general process will be apparent to those skilled in the art.

The phosphors of the present invention are chromium activated alkaline earth aluminates of hexagonal crystal structure incorporating divalent europium and optionally divalent manganese as sensitisers. When excited by short wavelength U.V. they emit in the infra-red as referred to hereinbefore and are of value in the manufacture of infra-red emitting fluorescent lamps which are of growing importance in such areas as optical coding processes, infra-red photography, the sorting of agricultural produce and plant growth.

Figure 2:
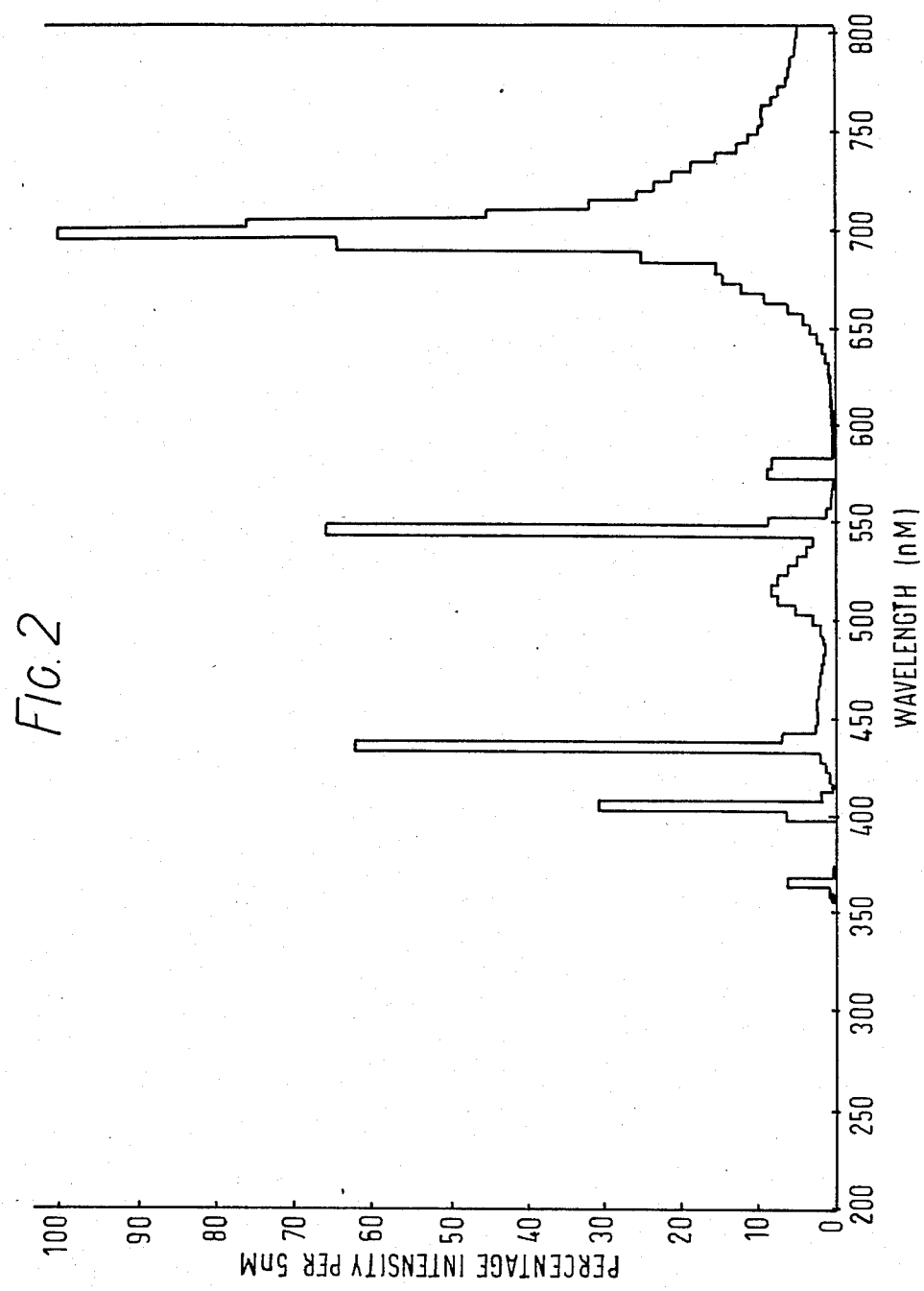

In order that the invention may be clearly understood and readily carried into effect, it will be described by way of example with reference to the accompanying drawings, of which:

FIG. 1 shows emission spectra of samples both according to and outside the scope of the invention, and FIG. 2 shows the spectral energy distribution curve of a fluorescent lamp incorporating a phosphor according to the invention.

The invention is illustrated by, but in no way limited to, the following examples:

EXAMPLE 1

A mixture of $BaCO_3$ (18.75 g), MgO (1.80 g), $MgF_2$ (0.31 g), $MnCO_3$ (5.75 g), $Al_2O_3$ (81.60 g), $Eu_2O_3$ (0.88 g) and $Cr_2O_3$ (0.228 g) was intimately ground and heated in an alumina tube for 2 hours at 1300° C. in a reducing atmosphere of 10% by volume of hydrogen in nitrogen. When cool the product was crushed and reheated for a further 2 hours at 1300° C. in a reducing atmosphere. When cool the product was ground and sieved to yield a phosphor in which $(w-y)=0.1188$ and A is wholly barium, $x=0.125$, and B represents equimolar quantities of Mn and Mg, $y=0.05$ w and $z=0.00375$. When irradiated by 254 nm radiation the product fluoresced in the infra-red with peak emission at 695 nm (characteristic of $Cr^{3+}$ emission). The emission spectrum of this sample is shown in FIG. 1 (curve 1).

EXAMPLE 2

A mixture of $BaCO_3$ (18.75 g), MgO (3.80 g), $MgF_2$ (0.31 g), $Al_2O_3$ (81.6 g), $Eu_2O_3$ (0.88 g) and $Cr_2O_3$ (0.228 g) was intimately ground and heated in the same manner as described in Example 1. When cool the product was crushed and sieved to yield a phosphor in which $(w-y)=0.1188$ and A is wholly barium, $x=0.124$ and B is wholly magnesium, $y=0.05$ w and $z=0.00375$. When irradiated by 254 nm radiation the product fluoresced in the infra-red with peak emission at 695 nm (characteristic of $Cr^{3+}$). The emission spectrum of this sample is shown in FIG. 1 (curve 2).

Also shown in FIG. 1 for the purposes of comparison are the emission spectra after 254 nm excitation of samples corresponding to the compositions $(w-y)=0.1188$ and A is wholly barium, $x=0.125$ and B is wholly magnesium, $y=0.05$ w and $z=0$ (curve 3); $(w-y)=0.1188$ and A is wholly barium, $x=0.125$ and B is equimolar quantities of magnesium and manganese, $y=0.05$ w and $z=0$ (curve 4). These materials, whose compositions are outside the scope of this invention, were prepared by grinding suitable reactants and treating in substantially the same manner as for the phosphors whose emissions are represented by curves 1 and 2. Curve 3 shows the characteristic emission of divalent europium when it is present as the only activator in the lattice. Curve 2 illustrates the extent of direct energy transfer between europium and chromium when the latter is incorporated into the lattice at $z=0.00375$. Curve 4 illustrates the transfer of europium to manganese alone. A comparison of curves 1 and 2 demonstrates the beneficial effect of incorporating manganese as an intermediate in the energy transfer between europium and chromium.

The spectral energy distribution of a 600 mm long 18 W fluorescent lamp coated with a phosphor prepared as in Example 1 and according to the invention is shown in FIG. 2.

When compared with a typical lithium aluminate:Fe phosphor although the initial relative infra-red energy outputs are both about the same, the output of our new phosphor only decreased to 95% after 100 hours of operation and only to 90% after 500 hours of operation, whereas the corresponding values for lithium aluminate:Fe phosphor were 80% and 70% respectively.

EXAMPLE 3

A mixture of $BaCO_3$ (18.75 g), $MnCO_3$ (10.93 g), $MnF_2$ (0.47 g), $Al_2O_3$ (81.6 g), $Eu_2O_3$ (0.88 g) and $Cr_2O_3$ (0.228 g) was intimately ground and heated in the same manner as described in Example 1. When cool the product was crushed and sieved and showed a similar emission to the phosphor of example 1, whose emission is shown in curve 1 of FIG. 1. In this example $(w-y)=0.1188$ and A is wholly barium, $x=0.128$ and B is wholly manganese, $y=0.05$ w and $z=0.00375$.

EXAMPLE 4

A mixture of $BaCO_3$ (18.75 g), ZnO (7.73 g), $ZnF_2$ (0.52 g), $MnCO_3$ (11.5 g), $Al_2O_3$ (71.4 g), $Eu_2O_3$ (0.88 g) and $Cr_2O_3$ (0.228 g) was intimately ground and heated in the same manner as Example 1 with the exception that the temperature was 1200° C. instead of 1300° C. When cool the product was crushed and sieved and found to have a similar emission to the phosphor of Example 1, whose emission is shown in curve 1 of FIG. 1.

In this example $(w-y)=0.136$ and A is wholly barium, $x=0.286$ and B represents equimolar quantities of zinc and manganese, $y=0.05$ w and $z=0.0043$.

EXAMPLE 5

A mixture of $SrCO_3$ (14.39 g), MgO (2.80 g), $MgF_2$ (0.31 g), $MnCO_3$ (8.58 g), $Al_2O_3$ (76.50 g), $Eu_2O_3$ (0.44 g) and $Cr_2O_3$ (0.114 g) was intimately ground and heated in the same manner as described in Example 1. When cool the product was crushed and sieved and found to have a similar emission to the phosphor of Example 1, whose emission is shown in curve 1 of FIG. 1. In this example $(w-y)=0.13$ and A is wholly strontium, $x=0.2$ and B represents equimolar quantities of magnesium and manganese, $y=0.025$ w and $z=0.002$.

According to usual practice in the lamp phosphor field, the phosphor materials can be diluted by replacing up to about 10 mol.% of the barium or strontium used in preparing the phosphors according to the present invention by equimolar amounts of calcium, or equivalent amounts of trivalent metals, such as lanthanum, yttrium, gadolinium. Similarly up to about 10 mol.% of aluminium may be replaced by an equimolar amount of gallium. When barium, strontium and aluminium are recited in the claims it is intended that this wording also embraces such diluted materials. Such dilution does not cause an unacceptable loss in brightness of the phosphor.

What is claimed is:

1. A trivalent chromium activated alkaline earth aluminate phosphor having a hexagonal crystal structure and divalent europium and optionally one or more of divalent manganese and zinc incorporated therein, and emitting in the region of the electromagnetic spectrum between 650 and 800 nm, having a composition represented by:

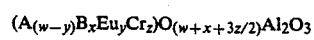

where
  A is barium, strontium or a combination thereof,
  B is magnesium which is replaceable partly or wholly by zinc and/or divalent manganese,
  w is in the range of from 0.01 to 0.6, x is in the range of from 0.01 to 0.98,
y is in the range of from 0.005 w to 0.70 w, and
z is in the range of from 0.0001 to 0.06, the divalent europium functioning as a sensitizer by absorbing ultraviolet radiation incident thereon and converting said radiation to energies that are absorbed by trivalent chromium and converted to infra-red radiation.

2. A phosphor according to claim 1 having divalent manganese incorporated therein.

3. A phosphor according to claim 1 in which w is in the range of from 0.015 to 0.35.

4. A phosphor according to claim 3 in which w is in the range of from 0.075 to 0.30.

5. A phosphor according to claim 1 in which x is in the range of from 0.012 to 0.65.

6. A phosphor according to claim 5 in which x is in the range of from 0.055 to 0.45.

7. A phosphor according to claim 1 in which y is in the range of from 0.005 w to 0.50 w.

8. A phosphor according to claim 7 in which y is in the range of from 0.0075 w to 0.25 w.

9. A phosphor according to claim 1 in which z is in the range of from 0.0003 to 0.025.

10. A phosphor according to claim 9 in which z is in the range of from 0.0005 to 0.0125.

11. A luminescent screen comprising a phosphor as claimed in claim 1.

12. A fluorescent lamp comprising an envelope, the internal surface of which is coated with a phosphor according to claim 1.

13. A fluorescent lamp according to claim 12 which is a low pressure mercury vapour discharge lamp.

14. A fluorescent lamp according to claim 12 which is a low pressure cadmium vapour discharge lamp.

* * * * *